United States Patent [19]

Skantar

[11] Patent Number: 5,096,266

[45] Date of Patent: Mar. 17, 1992

[54] DUAL-RESPONSE VENT VALVE DEVICE

[75] Inventor: Elmer T. Skantar, East Pittsburgh, Pa.

[73] Assignee: Westinghouse Air Brake Company, Wilmerding, Pa.

[21] Appl. No.: 652,692

[22] Filed: Feb. 8, 1991

[51] Int. Cl.$^5$ .................................. B60T 17/04
[52] U.S. Cl. ............................ 303/82; 137/494; 303/69; 303/86
[58] Field of Search ............... 303/82, 68–69, 303/33, 28, 37, 57, 81, 83, 86, 66, 36; 137/494, 506

[56] References Cited

U.S. PATENT DOCUMENTS

| | | |
|---|---|---|
| 3,165,115 | 1/1965 | Erson . |
| 3,570,529 | 3/1971 | Pickert .............................. 137/494 |
| 4,974,911 | 12/1990 | Hart ...................................... 303/82 |

Primary Examiner—Douglas C. Butler
Attorney, Agent, or Firm—J. B. Sotak

[57] ABSTRACT

A brake control system having a vent valve device in which a control piston is effective to unseat a normally closed vent valve to provide rapid exhaust of brake pipe pressure to either propagate an emergency brake application in response to brake pipe pressure on one side of the piston being reduced at an emergency rate or to initiate an emergency brake application when pressure on the opposite side of the piston is increased by an auxiliary pilot valve connected to a second main reservoir at a higher pressure.

15 Claims, 3 Drawing Sheets 5,096,266

DUAL-RESPONSE VENT VALVE DEVICE

BACKGROUND OF THE INVENTION

The present invention relates to vent valve devices, and particularly to such vent valve devices that are adapted to propagate an emergency rate of reduction of pressure in the brake pipe on the locomotive of a railway train.

A typical locomotive brake valve device, such as the well-known 26C Brake Valves, incorporates a vent valve that is operated manually by movement of the brake valve handle to emergency position, thereby initiating an emergency rate of reduction of the locomotive brake pipe pressure. A typical locomotive brake system may also include an E-3 Brake Application Valve that is operated independently of the locomotive brake valve, and provides a means of initiating an emergency venting of brake pipe pressure at a location remote from the locomotive brake valve. In addition, an independent vent valve device, such as the well-known #8 Vent Valve, is employed on a locomotive to in turn vent the locomotive brake pipe in response to an emergency rate of reduction of the brake pipe pressure initiated by the locomotive brake valve or by the E-3 Brake Application Valve in order to propagate the emergency venting of brake pipe pressure through the locomotive to a trailing locomotive and/or to the cars of a railway train. It is well-known in the railway braking art that Control Valves on these locomotives and/or cars are rate-sensitive and, accordingly, respond to an emergency reduction of brake pipe pressure to effect an emergency application of the locomotive and/or car brakes.

All of the above-mentioned locomotive valves are conventional components of a locomotive brake system and are manufactured by the Westinghouse Air Brake Company.

As mentioned above, the #8 Vent Valve propagates an emergency brake application by venting brake pipe pressure in response to an emergency rate of reduction of the brake pipe pressure. When the brake pipe pressure is reduced at a sufficiently rapid rate to establish a predetermined differential pressure between air stored in a control chamber (typically referred to as the quick action chamber) and air in the brake pipe, an actuating piston subject to this predetermined pressure differential, on opposite sides thereof, operates to open a vent valve via which the brake pipe air is vented to atmosphere substantially unrestricted. Proper tuning, by appropriate selection of chokes between the control chamber and the brake pipe pressures, establishes the predetermined pressure differential required to operate the actuating piston when an emergency rate of reduction occurs.

It will be appreciated, however, that in order to provide stability during service braking, the emergency rate of brake pipe reduction at which the #8 Vent Valve is set to operate must be significantly greater than the maximum service rate, to thereby prevent inadvertent and undesired emergency brake applications from occurring, due to brake pipe pressure fluctuations, for example. For this reason, the #8 Vent Valve is not entirely positive in its operation.

SUMMARY OF THE INVENTION

The main object of the present invention, therefore, is to provide a vent valve device that has a dual-response capability that provides vent valve actuation in response to either an emergency rate of reduction of brake pipe pressure or, alternatively, in response to pilot operation thereof.

In meeting this objective, there is provided, in a railway vehicle brake system including a brake pipe in which compressed air is carried at a certain chosen value and a reservoir in which compressed air is stored at a minimum value exceeding the predetermined brake pipe pressure, a vent valve device comprising a casing having a control chamber and a balancing chamber, a first port via which the brake pipe air is connected to the control chamber, throttling means via which the control chamber air is connected to the balancing chamber, a movable abutment subject opposingly to the compressed air in the control and balancing chambers, an exhaust port, a vent valve operated by movement of the piston abutment for venting brake pipe pressure in response to a predetermined pressure differential between the control and balancing chambers, and a second port via which compressor air may be selectively connected from the reservoir to the balancing chamber.

BRIEF DESCRIPTION OF THE DRAWINGS

These and other objects and advantages of the invention will become apparent from the following more detailed explanation when taken in conjunction with the accompanying drawing in which.

DESCRIPTION AND OPERATION

Figure 1:
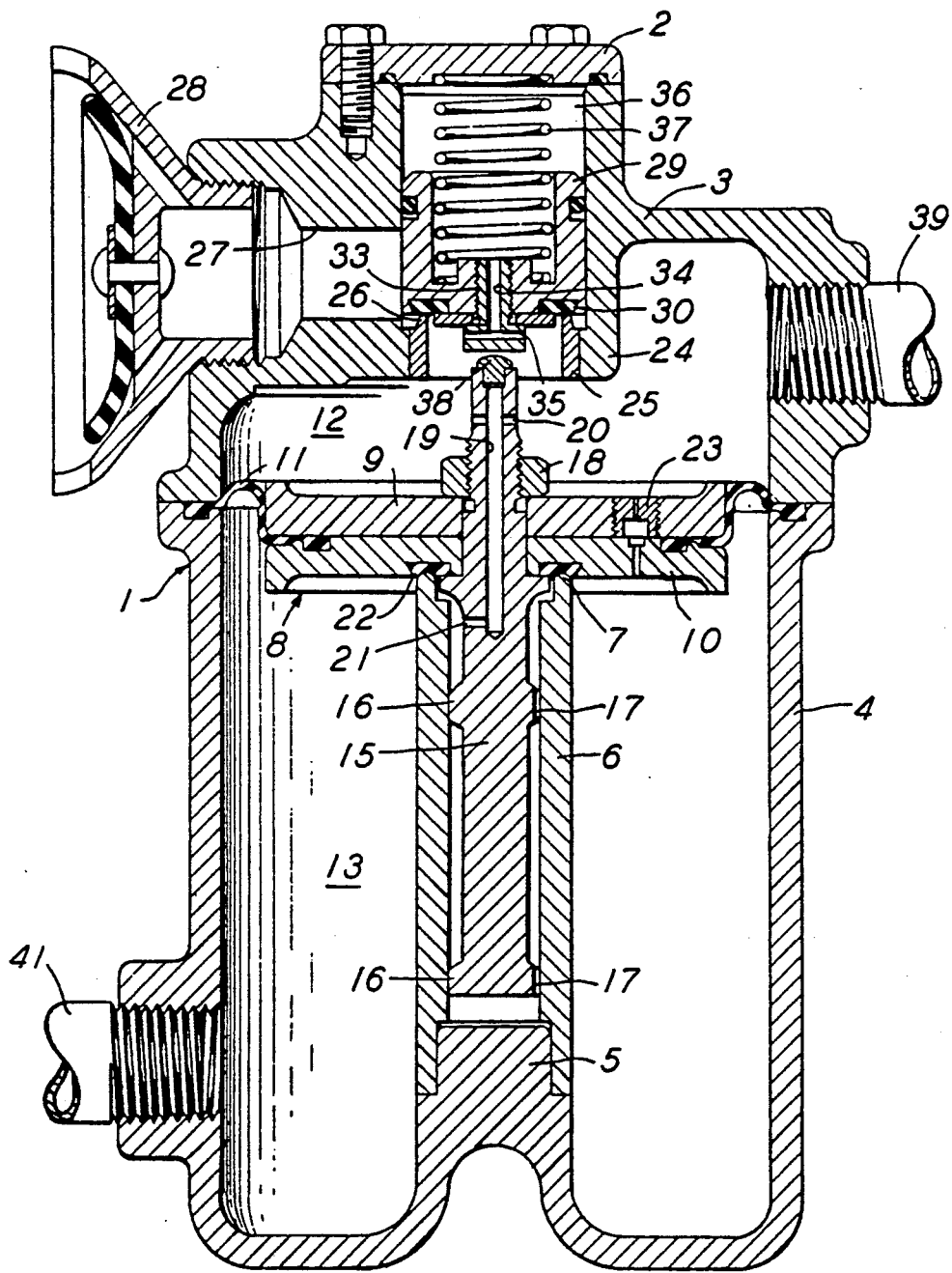
FIG. 1 is a sectional assembly view of a vent valve device arranged to either propagate an emergency brake application or to initiate an emergency brake application.

Referring to FIG. 1 of the drawings, there is shown a vent valve device, indicated generally as 1, comprising a cover 2, an upper end section 3, and a main body section 4 secured together by any suitable means.

Extending upwardly and centrally into the inner chamber of main body section 4 from the bottom end portion thereof is a cylindrical boss 5, which boss 5 is suitably annularly recessed at its upper end portion to receive, as by a press fit, a vertically upwardly-extending tubular guide member 6. The upper end portion of tubular guide member 6 is rounded to provide an annular valve seat 7 for a valve to be described. A movable abutment, such as a diaphragm-type piston 8, is suitably located between the upper end section 3 and the main body section 4. Diaphragm piston 8 comprises a centrally apertured upper follower disc 9 and a centrally apertured lower follower disc 10, which follower discs are suitably secured together, as hereinafter described, to clamp the inner peripheral edge of an annular resilient diaphragm 11 therebetween. The outer marginal edge of the diaphragm 11 is suitably clamped between the upper end section 3 and the main body section 4.

Movable abutment or diaphragm-type piston 8 separates the sectionalized casing 1 into upper and lower chambers; wherein the upper chamber is hereinafter referred to as the control chamber 12, as defined by the upper surface of diaphragm-type piston 8 and the inner wall surface of upper end section 3, and wherein the lower chamber is hereinafter referred to as the balancing chamber 13, as defined by the lower surface of the diaphragm-type piston 8 and the main body section 4.

The central apertures of the upper and lower follower discs 9 and 10 receive an elongated, longitudinally-extending guide stem 15, which guide stem 15 has several longitudinally-spaced, radially-extending guide flanges 16 on the lower portion thereof for slidingly-engaging the inner wall surface of the bore of tubular guide member 6. Flanges 16 are grooved, as at 17, to provide for pressure equalization throughout the bore of the tubular guide member 6. The upper end portion of guide stem 15 extends upwardly and outwardly beyond the diaphragm-type piston 8 and is suitably threaded to receive a nut 18 to rigidly-connect the guide stem 15 to the diaphragm-type piston 8 and to secure the followers 9 and 10 together.

Guide stem 15 has a bore 19 that extends along the longitudinal centerline thereof from a point at the upper end portion of the stem to a point below the lower follower disc 10 of diaphragm-type piston 8. A series of radially-extending ports 20 connect the control chamber 12 with the upper end of bore 19, and a radially-extending restricted port 21 in guide stem 15 communicates with the lower end of bore 19, which restricted port 21 connects the clearance space provided between the inner wall surface of the bore of tubular guide member 6 and the outer wall surface of the guide stem 15 with the lower end of bore 19. The bottom surface of lower follower disc 10 of diaphragm-type piston 8 is suitably annularly recessed, which recess receives a flat annular valve 22 which is adapted to abuttingly-engage the annular valve seat 7 on the upper end of tubular guide member 6. Movement of diaphragm-type piston 8, relative to the stationary tubular guide member 6, moves valve 22 upwardly, relative to the annular valve seat 7, to provide communication between the balancing chamber 13 and the control chamber 12 through the clearance space provided between the inner wall surface of the bore of tubular guide member 6 and the outer wall surface of guide stem 15, bore 19, and ports 20, 21.

The upper and lower follower discs 9 and 10 have a restricted orifice, or choke fitting 23, spaced radially outwardly from the longitudinal centerline thereof, via which restricted communication is provided between the control chamber 12 and the balancing chamber 13 to allow normal charging of the balancing chamber 13 from the control chamber 12, as well as to allow escape of air from the balancing chamber 13 to the control chamber 12 during normal fluctuations of the charged brake pipe pressure in control chamber 12.

The upper end section 3 of casing 1 has a downwardly-extending cylindrical member 24, the lower, inner diameter end of which receives an annular bushing 25 secured integral therewith, as by a press fit. The upper end portion of cylindrical bushing 25 terminates in a sealing bead 26 to provide a valve seat for a valve to be described. A laterally-extending bore 27 in the upper end portion of upper end section 3 has one end communicating directly to atmosphere through a protected exhaust port fitting 28 of well-known design, and the other end opening into the cylindrical member 24. Slidably-received within the bore of the cylindrical member 24 is a piston valve 29 having an annular valve 30 located on its lower bottom surface that is adapted to engage sealing bead 26. The outer seated portion of valve 30 is subject to the atmospheric pressure and the inner seated portion is subject to the pressurized fluid in control chamber 12. With annular valve 30 seated on sealing bead 26, communication between brake pipe chamber 12 and laterally-extending bore 27 is blocked.

Piston valve 29 has a threaded bore extending axially therethrough to receive a threaded member 33, which has a bore 34 extending longitudinally therein communicating with a laterally-extending passageway 35 at its lowermost end to connect the control chamber 12 with a chamber 36 defined by the upper end section 3 and the inner wall surface of the piston valve 29, which chamber is hereinafter referred to as a loading chamber. The inner bottom surface of piston valve 29 is suitably annularly recessed to provide a seat for a helical spring 37 located in the loading chamber 36. Spring 37 biases piston valve 29 downwardly to press valve 30 into engagement with the sealing bead 26 on annular bushing 25. The uppermost end portion of guide stem 15 has a projection 38 substantially in alignment with the central portion of the piston valve 29 such that upward movement of the diaphragm-type piston 8 causes the projection 38 to engage and displace the piston valve 29 upwardly, relative to the annular bushing 25, to unseat valve 30 of piston valve 29 from seat 26 to open communication between the control chamber 12 and the laterally-extending bore 27.

A conduit 39 connects chamber 12 to a brake pipe 40 of the automatic air brake system on a railway vehicle, the pressure of which is controlled by the usual brake valve on the locomotive.

Another conduit 41 is communicated with balancing chamber 13 via main body section 4. Conduit 41 includes a one-way check valve 42 to which the outlet of a double check valve device 44 is connected via a conduit 43. Conduit 43 is also connected to a power cut-off switch 43a. One input of double check valve device 44 is connected to a conduit 45 and the other input is connected to a conduit 46. Conduit 45 is, in turn, connected to the outlet of a two-position emergency magnet valve device 47, one input of which is connected to a second main reservoir 48 via a conduit 49. The other input of emergency magnet valve device 47 is connected via a conduit 50 to the outlet of a two-position, pushbutton-operated pneumatic valve 51, one input of which is connected via a conduit 52 to second main reservoir 48 and the other input of which is connected to atmosphere at a vent port 53. This pushbutton-operated pneumatic valve 51 is envisioned as being located in the locomotive cab. Conversely, emergency magnet valve device 47 is located remote from the locomotive cab, but is adapted to be energized via wires B+, B− by any of various switch arrangements associated with the engineer's brake valve or controller, as represented by block 54.

One such switch arrangement contemplates a switch in the brake valve or controller handle to initiate an emergency. The brake valve or controller handle position that is normally translated by a computer from either a digital or an analog signal acts through transistor switch or VMOS driver circuit to operate the emergency magnet valve device 47 when the handle is moved to emergency position. Other arrangements, such as a pushbutton switch on the brake valve or controller console, may also be employed to control emergency magnet valve device 47. Pushbutton-operated pneumatic valve 51 may also include an electrical switch to control device 47. Device 51, therefore, offers two means for connecting main reservoir pressure 48 to conduit 45.

A dual function, two-position, manually-operated pneumatic valve 55 has one outlet connected to conduit 46 and another outlet connected to atmosphere at a vent port 56. A conduit 57 is connected between second main reservoir 48 and one inlet 58 of pneumatic valve 55 that is normally cut off from conduit 46. Another conduit 59 is connected between the other inlet 60 of pneumatic valve 55 and brake pipe 40, inlet 60 being normally cut off from vent port 56.

In operation, the conduit 14 communicates pressure in brake pipe 40 directly with the control chamber 12 to charge the control chamber 12 to the same pressure that exists in the brake pipe 40. On charging of the control chamber 12, the diaphragm-type piston 8 moves downwardly and seats the valve 30 on the seat 7 with the restricted orifice 23 allowing the balancing chamber 13 to be charged to the same pressure as exists in the control chamber 12. Orifice 23 allows the restricted flow of pressurized air from the balancing chamber 13 back into the brake pipe chamber for normal brake pipe pressure fluctuations.

During a service brake application, a service rate of pressure reduction in brake pipe 40 will be effected in a well-known manner by the brake valve or controller on the locomotive, which results in a corresponding rate of reduction in fluid pressure in control chamber 12 via conduit 39. Since orifice 23 restricts the flow of fluid under pressure from balancing chamber 13 to the control chamber 12, a differential in pressure results between the respective chambers 12 and 13 to thereby cause the higher pressure in balancing chamber 13 to act on diaphragm-type piston 8 and to move the diaphragm-type piston 8 upwardly out of a normal position in which it is shown in the drawing along with the guide stem 15. Such action unseats valve 30 from the seat 7 to thereby permit the escape of pressurized air from the balancing chamber 13 via bore 19, ports 20, 21, to the control chamber 12 to effect an equalizing action therebetween. During such a service rate of reduction in brake pipe pressure, port 21 provides for a restricted flow of pressurized fluid from balancing chamber 13 to control chamber 12 to stabilize the movement of diaphragm-type piston 8. The rate at which pressure reduction is made in the brake pipe governs the rate of reduction effected in control chamber 12, so that with a differential in pressures existing between chambers 12 and 13, annular valve 30 of diaphragm-type piston 8 remains unseated until the respective pressure in chambers 12 and 13 are leveled off. During such a service rate of reduction in pressure in control chamber 12, the resultant pressure differential between chambers 12 and 13 is not sufficient to displace the diaphragm-type piston 8 upwardly a sufficient distance to displace or unseat the annular valve 30 of piston valve 29.

Upon an emergency rate of brake pipe reduction, a sufficient differential in the pressures in control chamber 12 and the balancing chamber 13 results to thereby move the diaphragm-type piston 8 upwardly at a relatively rapid rate to cause the projection 38 on the upper end of the guide stem 15 to unseat the piston valve 29 to thereby connect the control chamber 12 directly to bore 27 and accordingly vent the pressurized fluids from control chamber 12 to atmosphere. Bore 27, being directly connected to atmosphere, vents the pressurized air from the control chamber 12 at a fast rate to effect a rapid local reduction of air pressure in the brake pipe 40. Since the brake pipe is connected to conduit 39 and the control chamber 12, emergency propagation of the brake pipe pressure is realized. It is to be understood that since the piston valve 29 is provided with the passageway 35 and the bore 34 connecting the control chamber 12 to loading chamber 36, the pressurized fluid acts on the entire cross-sectional area of the piston valve 29, whereas with the annular valve 30 having its inner seated portion in engagement with the sealing bead 26 and with the outer unseated portion subject to atmospheric pressure, a greater force is developed to maintain the piston valve 29 seated due to the difference in areas subject to the same pressures, which, when taken with spring 37, provides a positive means for controlling the force requirement to unseat the piston valve 29 for an emergency rate of reduction. Upon such displacement or unseating of piston valve 29, the escape of pressurized air from the loading chamber 36 through bore 34 and passageway 35 is relatively fast, since there is no restriction to the flow therefrom and since the volume to be drained is relatively small. Such upward movement of the diaphragm-type piston 8, although unseating the annular valve 22 from the seat 7, which communicates the control chamber 12 and the balancing chamber 13, does not vent the pressurized fluid from the balancing chamber 13 to control chamber 12 at a sufficient rate to counteract the rapid reduction of air pressure from the control chamber 12. Pressurized air from the balancing chamber 13 continues to flow into the control chamber 12 via orifice 23 and restricted port 21 until the fluid in the brake pipe and the control chamber 12 is fully vented. The rate of reduction in pressurized air from the balancing chamber 13 to the control chamber 12 is slower than the rate of reduction occurring from the loading chamber 36 to control chamber 12 and to atmosphere via bore 27. As an example of the relative times required to effect such reductions, loading chamber 36 takes one-tenth of a second to reduce to atmospheric pressure upon actuation of piston valve 29, whereas balancing chamber 13 takes one minute to vent to atmospheric pressure to thereby equalize the pressures between the balancing chamber 13 and the control chamber 12. Since the loading chamber 36 is vented before balancing chamber 13, the differential pressure existing across diaphragm-type piston 8 maintains the projection 38 in engagement with piston valve 29 until the fluid in control chamber 12 is fully vented, at which time spring 37 acting on piston valve 29 biases valve 30 of piston valve 29 into seating engagement with the sealing bead 26 so that thereafter, upon introduction of pressurized fluid into the brake pipe and the control chamber 12, the pressurized fluid exerts a downward force on diaphragm piston 9 to thereby seat the annular valve 30 on valve seat 7.

In the foregoing discussion, operation of vent valve device 1 has been explained relative to one aspect of its operation, in which rapid local venting of brake pipe pressure is provided in response to an emergency rate of reduction of brake pipe pressure, to thereby propagate an emergency application signal through the brake pipe.

In accordance with the present invention, vent valve device 1 is further capable of initiating an emergency venting of brake pipe pressure, as opposed to being operative in response to such emergency venting of brake pipe pressure, as mentioned above. The locomotive engineer has the capability of initiating an emergency brake application through the vent valve device 1 by pressurizing balancing chamber 13 via conduit 41. Chamber 13 is normally charged to the pressure carried in brake pipe 40, as explained in accordance with that aspect of operation in which vent valve device 1 is operative responsively to an emergency rate of brake pipe pressure reduction. Typically, brake pipe 40 and, consequently, chamber 13 is charged to a value of between 70-110 psi, it being understood that check valve 42 prevents this air in chamber 13 from flowing to conduit 43 and thence to atmosphere via double check valve 44, conduit 45, emergency magnet valve 47, conduit 50, and port 53 of pushbutton valve 51.

As is well known in the railroad industry, second main reservoir 48 is charged with air at a pressure that is maintained between 130-150 psi. It will be appreciated, therefore, that the minimum pressure effective at second main reservoir 48 is greater than the maximum pressure at which balancing chamber 13 is charged, by a value of at least 20 psi.

When it is desired to initiate an emergency brake application through vent valve device 1, as opposed to propagating an already initiated emergency, the locomotive engineer can momentarily operate any one of several pilot valves or switches 47, 51, 54 and 55. In operating pushbutton valve 51, for example, a conduit 50 is disconnected from vent port 53 and connected, instead, to second main reservoir 48 via conduit 52. In the normally deenergized condition of emergency magnet valve device 47, as shown, conduit 50 is connected to conduit 45. Consequently, compressed air in second main reservoir 48 is connected to balancing chamber 13 of vent valve device 1 via pushbutton switch 51, emergency magnet valve device 47, double check valve device 44, conduit 43, check valve 42 and conduit 41. The volume of balancing chamber 13 is relatively small compared to the volume of second main reservoir 48, so that the resultant influx of compressed air at 130-150 psi causes a rapid pressure increase in balancing chamber 13 above the brake pipe pressure of 70-110 psi to which balancing chamber 13 is normally maintained. The restricted air flow between chambers 12 and 13 afforded by orifice 23 and restricted port 21 prevents this pressure pulse from being dissipated to brake pipe 40, so that a predominance of pressure is developed in balancing chamber 13. The resultant pressure differential between balancing chamber 13 and chamber 12 is effective to actuate the diaphragm-type piston 8 in a direction to cause projection 38 of guide stem 15 to engage and displace annular valve 30 of piston valve 29 from seat 26. The compressed air in brake pipe 40 is thus vented directly to atmosphere at a fast rate via conduit 39, chamber 12, unseated vent valve 26/30, bore 27, and vent protector 28, to accordingly initiate an emergency reduction of brake pipe pressure.

As an alternative to initiating this emergency reduction of brake pipe pressure through pushbutton valve 51, emergency magnet valve device 47 may also be operated to achieve the same result, i.e., initiation of an emergency reduction of brake pipe pressure. Any of various switch means 54 may be employed to energize emergency magnet valve device 47. The resultant energization of magnet valve device 47 cuts off conduit 45 from conduit 50 and connects and establishes a direct path via which compressed air in second main reservoir 48 is connected from conduit 49 to conduit 45 in bypass of pushbutton valve 51. The air in the second main reservoir 48 is thus connected via double check valve device 44 to vent valve chamber 13, in the same manner as explained relative to operation of pushbutton valve 51, to effect operation of vent valve device 1 and thereby initiate an emergency reduction of brake pipe pressure.

Figure 3:
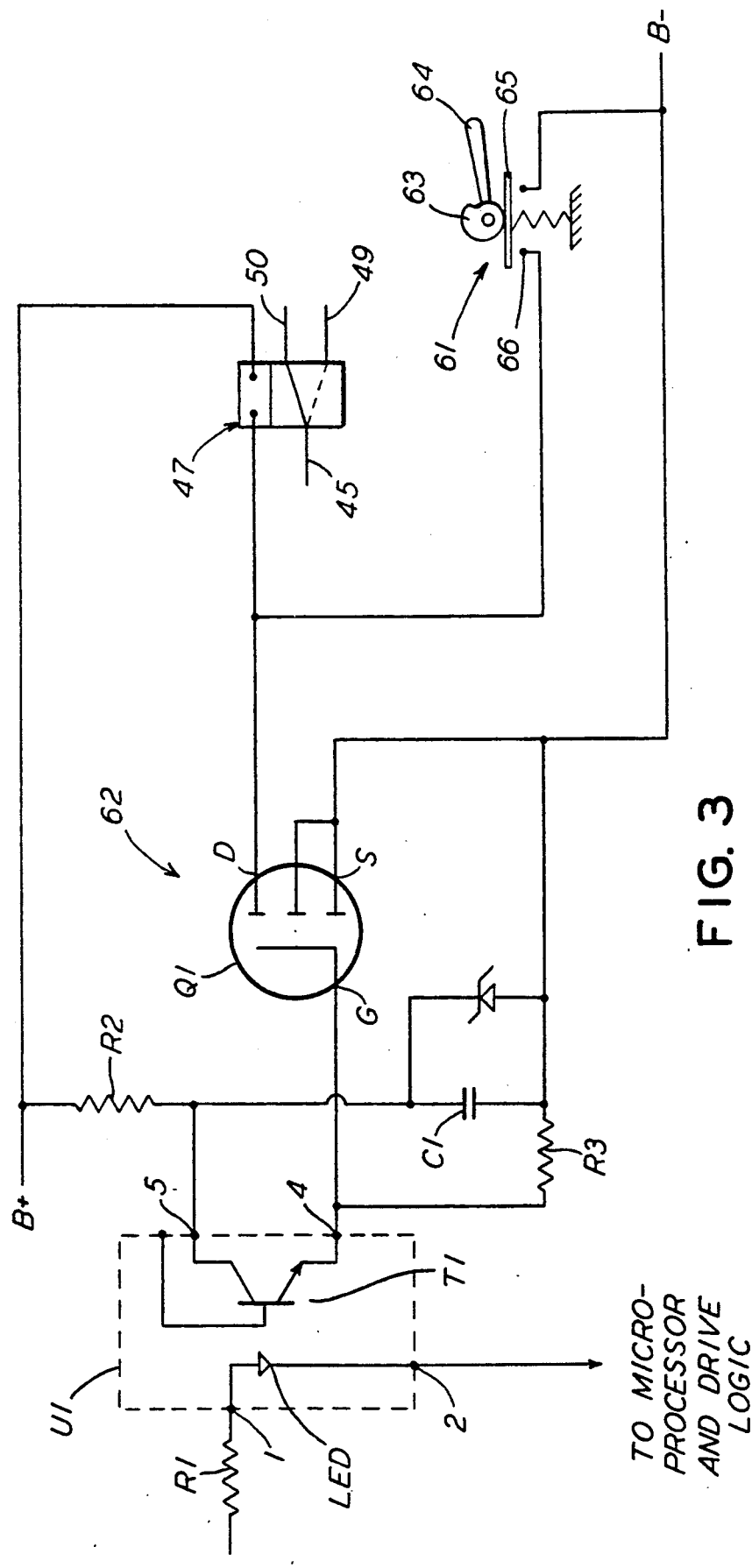
FIG. 3 is a circuit for electrically controlling a magnet valve device in response to movement of the locomotive brake valve handle to emergency position, as one means of initiating an emergency brake application through the vent valve device of FIG. 1.

In FIG. 3 of the drawings are shown several examples of switching circuits via which emergency magnet valve device 47 may be actuated, including a cam operated switch 61 and a micro-processor controlled solid state switch 62. Both the cam operated switch 61 and solid state switch 62 may be associated with the handle of the locomotive brake valve device or controller.

In the case of switch 61, a cam 63 associated with the brake valve operating handle 64 is employed to operate a spring-loaded switch element 65 that opens and closes contacts 66 in the negative lead B— of the coil in emergency magnet valve device 47. Cam 63 is designed to effect closure of contacts 66 only in emergency position of brake valve handle 64, thereby completing a circuit to the positive lead B+ of the emergency magnet valve coil. In this manner the emergency magnet valve device 47 is energized in emergency position to connect conduit 49 to conduit 50 and accordingly actuate vent valve device 1, as explained.

In the case of solid state switch 62, a power transistor Q1 is arranged in the negative lead B— of the emergency magnet valve coil in parallel with switch 65-66. Power transistor Q1 is controlled by an opto-isolator U1 that is operated through a micro-processor or discrete logic capable of determining emergency position of brake valve handle 64. Various encoders, such as are known in the art for deriving an electrical signal corresponding to a certain degree of handle movement, may be employed to sense emergency position of the brake valve handle.

In emergency position, the micro-processor outputs a logical low signal at terminal 2 of opto-isolator U1, which is the return to the 5 volt D.C. negative supply at input 1 via resistor R1, completing the circuit to the internal light emitting diode LED. This optical coupling to the internal transistor T1 of opto-isolator U1 causes the transistor to turn on, so that current flows from B+ to the gate terminal G of power transistor Q1 via resistor R2 and terminals 5 and 4 of transistor T1. The gate to source voltage at terminal S of power amplifier Q1 exceeds the bias voltage at terminal G set by bias resistor R3 and gate current starts to flow from terminal G to terminal S. This causes power amplifier Q1 to switch on, such that current is conducted from terminal 0 to terminal S. In this conducting state, power amplifier Q1 establishes a path via which current flows from B+ to the negative lead B— via the coil of emergency magnet valve device 47, thereby energizing the magnet valve to accordingly actuate vent valve device 1, as explained.

Upon subsequent movement of brake valve handle 64 out of emergency position, cam operated switch 61 will open to interrupt current flow to the coil of magnet valve 47. The input to the micro-processor will be removed, as well. However, the micro-processor can be programmed to logical restraints and time delays on the input to opto-isolator U1, in order to maintain the coil of emergency magnet valve 47 energized until all conditions have been met to permit reset (deenergization) of the emergency magnet valve. At this time, terminal 2 of opto-isolator U1 will transition to a high logical level, turning off transistor T1, which in turn causes power transistor Q1 to turn off and thereby deenergize the coil of magnet valve device 47.

Figure 2:
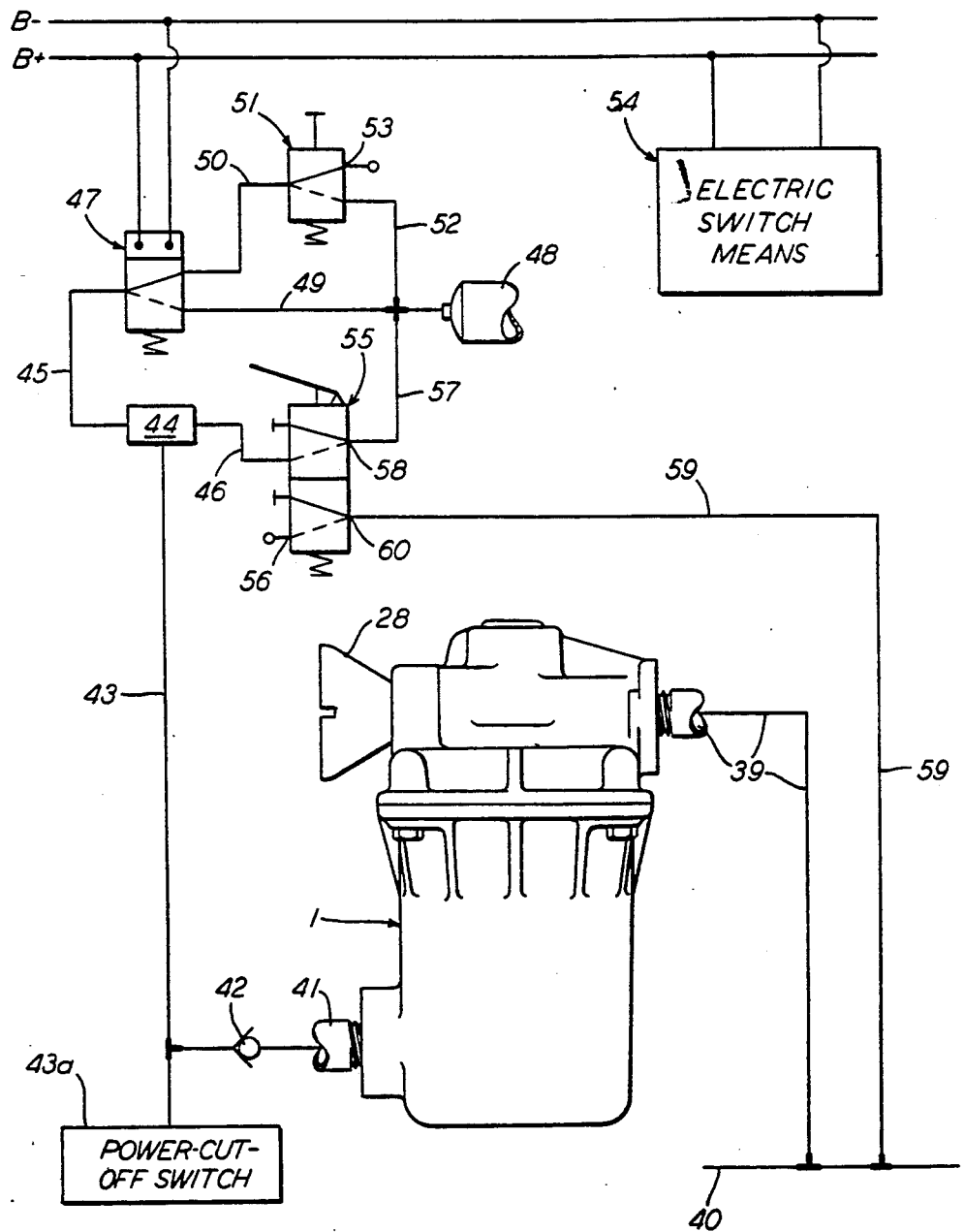
FIG. 2 is a block diagram of a brake control system in which the vent valve device of FIG. 1 is controlled by selective operation of various switches and/or valves to initiate an emergency brake application.

Presently, some railroads employ a dual-ported emergency brake valve device, in which a 1¼ inch ball valve and a ⅜ inch ball valve are operated in unison through a common handle to vent brake pipe pressure and to supply air to the power cutoff switch, respectively. This dual-function valving is represented in the drawing of FIG. 2 by pneumatic valve 55, which, when operated, vents brake pipe pressure via conduit 59, inlet 60, and vent port 56, while concurrently connecting compressed air from second main reservoir 48 to the other inlet of double check valve device 44 via conduit 57, inlet 58 of pneumatic valve 55, and conduit 46.

This not only results in vent valve balancing chamber 13 being pressurized via double check valve device 44, conduit 43, check valve 42, and conduit 41, but also concurrently results in control chamber 12 losing pressure due to brake pipe pressure being released via conduit 59, inlet 60, and vent port 56 of pneumatic valve 55. The pressure differential between chambers 12 and 13 that is required to cause the diaphragm-type piston 8 to disengage valve 30 from seat 26 is thus produced, in one sense, by the pressurization of balancing chamber 13, and in another sense, by the depressurization of control chamber 12, as a consequence of pneumatic valve 55 being operated.

During such initiation of an emergency brake application by pressurization of balancing chamber 13, it will be appreciated that power cut-off switch 43a is concurrently actuated via conduit 43 to interrupt the locomotive power.

Following actuation of vent valve device 1 in accordance with either aspect of its operation, i.e., in response to the occurrence of an emergency rate of reduction of brake pipe pressure to propagate an emergency brake application, or in response to being pilot-operated to effect an emergency rate of reduction of brake pipe pressure for initiating an emergency brake application, the pressure in balancing chamber 13 dissipates via restricted port 21 and the restricted orifice of choke fitting 23. This dissipation of balancing chamber 13 pressure thus occurs at a controlled rate to establish a timing period during which the diaphragm-type piston 8 is maintained in its actuated position to hold vent valve piston 29 disengaged from seat 26. The duration of this "blowdown" time is selected to assure complete stoppage of a train under emergency braking, since the open vent valve will prevent the brake pipe pressure from being recharged to release the brakes.

It will be understood, of course, that this blowdown of chamber 13 is predicated on reset of whichever one of the pilot valve devices 47, 51, or 55 may have been operated to initiate the emergency venting of brake pipe pressure via vent valve device 1. In their respective reset positions, as shown, the aforementioned pilot valve devices isolate second main reservoir 48 from chamber 13, so that the blowdown of chamber 13 is not influenced by the reservoir pressure. When the pressure in balancing chamber 13 is depleted sufficiently, spring 37 reseats piston valve 29 to close off venting of control chamber 12. Vent valve device 1 is thus conditioned to be recharged, as previously explained, preparatory to subsequent operation responsive either to an emergency rate of reduction of brake pipe pressure effective at control chamber 12 or to pressurization of balancing chamber 13.

I claim:

1. A railway vehicle emergency brake control system comprising:

(a) a brake pipe in which fluid under pressure is carried at a predetermined value;
   (b) a reservoir in which fluid under pressure is stored, the minimum value of said reservoir pressure exceeding said predetermined value;
   (c) a vent valve device including:
      (i) a casing having a control chamber and a balancing chamber;
      (ii) a first port in said casing to which said brake pipe is connected, said first port being communicated with said control chamber;
      (iii) throttling means for establishing fluid pressure communication between said control chamber and said balancing chamber;
      (iv) a movable piston abutment subject opposingly to fluid pressure in said control and balancing chambers;
      (v) an exhaust port in said casing;
      (vi) vent valve means between said control chamber and atmosphere for venting said control chamber via said exhaust port when a predetermined pressure differential exists between said control and balancing chambers in a direction to effect movement of said piston abutment toward engagement with said vent valve means; and
      (vii) a second port in said casing communicated with said balancing chamber; and
   (d) means for selectively connecting fluid under pressure stored in said reservoir to said second port.

2. A railway vehicle emergency brake control system, as recited in claim 1, wherein said means for connecting said fluid under pressure stored in said reservoir to said second port comprises:

(a) a conduit connecting said reservoir to said second port; and
   (b) control means in said conduit for supplying fluid under pressure from said reservoir to said balancing chamber.

3. A railway vehicle emergency brake control system, as recited in claim 2, further including a one-way check valve in said conduit.

4. A railway vehicle emergency brake control system, as recited in claim 2, wherein said control means comprises first valve means in said conduit between said reservoir and said second port.

5. A railway vehicle emergency brake control system, as recited in claim 4, wherein said first valve means comprises a magnet valve device, said brake system further comprising electric switch means for controlling energization of said magnet valve device.

6. A railway vehicle emergency brake control system, as recited in claim 5, wherein said control means further comprises second valve means between said reservoir and said magnet valve device for connecting fluid under pressure from said reservoir to said magnet valve device.

7. A railway vehicle emergency brake control system, as recited in claim 6, wherein said magnet valve device has an energized position in which fluid under pressure is connected directly from said reservoir to said conduit and a deenergized position in which fluid under pressure is connected from said reservoir to said conduit via said second valve means.

8. A railway vehicle emergency brake control system, as recited in claim 7, wherein said second valve means is a manually operable pneumatic valve.

9. A railway vehicle emergency brake control system, as recited in claim 8, further comprising a one-way check valve in said conduit between said magnet valve device and said second port.

10. A railway vehicle emergency brake control system, as recited in claim 4, wherein said first valve means is a manually operable pneumatic valve comprising:
   (a) a first inlet port;
   (b) a delivery port communicated with said conduit;
   (c) a second inlet port; and
   (d) a vent port communicated with atmosphere, said first valve means having an actuated position in which said first inlet port is connected to said delivery port and said second inlet port is connected to said vent port.

11. A railway vehicle emergency brake control system, as recited in claim 10, further comprising a one-way check valve in said conduit between said delivery port of said pneumatic valve and said second port of said vent valve device.

12. A railway vehicle emergency brake control system, as recited in claim 2, wherein said control means comprises:
   (a) a double check valve device having first and second inlets and an outlet to which said conduit is connected;
   (b) a magnet valve device having an outlet connected to said first inlet of said double check valve device and a first inlet to which said reservoir is connected;
   (c) electric switch means for controlling energizing of said magnet valve device such as to connect said inlet thereof to said outlet thereof; and
   (d) a first manually operable pneumatic valve having a delivery port connected to said second inlet of said double check valve device and a first inlet to which said reservoir is connected, said first pneumatic valve having an actuated position in which said first inlet of said first pneumatic valve is connected to said delivery port.

13. A railway vehicle emergency brake control system, as recited in claim 12, wherein said first pneumatic valve further comprises a vent port connected to atmosphere and a second inlet to which said brake pipe is connected, said second inlet of said first pneumatic valve being connected to said vent port in said actuated position thereof.

14. A railway vehicle emergency brake control system, as recited in claim 13, further comprising a second manually operable pneumatic valve having an outlet connected to a second inlet of said magnet valve and an inlet to which said reservoir is connected, said second pneumatic valve having an actuated position in which said inlet thereof is connected to said outlet thereof, said magnet valve device having a de-actuated position in which said second inlet of said magnet valve device is connected to said outlet thereof.

15. A railway vehicle emergency brake control system, as recited in claim 14, further comprising a one-way check valve in said conduit between said outlet of said double check valve device and said second port of said vent valve device.

* * * * *